(12) United States Patent
Suzuki

(10) Patent No.: US 12,195,180 B2
(45) Date of Patent: Jan. 14, 2025

(54) FRAME ASSEMBLY AND METHOD FOR MANUFACTURING SAME

(71) Applicant: AERONEXT INC., Tokyo (JP)

(72) Inventor: Yoichi Suzuki, Tokyo (JP)

(73) Assignee: AERONEXT INC., Tokyo (JP)

( * ) Notice: Subject to any disclaimer, the term of this patent is extended or adjusted under 35 U.S.C. 154(b) by 50 days.

(21) Appl. No.: 17/794,554

(22) PCT Filed: Feb. 29, 2020

(86) PCT No.: PCT/JP2020/008560
§ 371 (c)(1),
(2) Date: Jul. 21, 2022

(87) PCT Pub. No.: WO2021/171633
PCT Pub. Date: Sep. 2, 2021

(65) Prior Publication Data
US 2023/0083990 A1    Mar. 16, 2023

(51) Int. Cl.
*B64C 39/02* (2023.01)
*B64C 1/06* (2006.01)
*B64C 1/08* (2006.01)
*B64F 5/10* (2017.01)
*F16B 5/04* (2006.01)
*B64U 10/13* (2023.01)

(52) U.S. Cl.
CPC .............. *B64C 39/024* (2013.01); *B64C 1/06* (2013.01); *B64C 1/08* (2013.01); *B64F 5/10* (2017.01); *F16B 5/04* (2013.01); *B64U 10/13* (2023.01)

(58) Field of Classification Search
CPC . B64C 39/024; B64C 1/06; B64C 1/08; B64F 5/10; F16B 5/04; B64U 10/13; B64U 20/65; B64U 20/70; Y02T 50/40
See application file for complete search history.

(56) References Cited

U.S. PATENT DOCUMENTS

| | | | |
|---|---|---|---|
| 3,623,936 A * | 11/1971 | Hotz | E04C 2/34 428/116 |
| 4,761,930 A * | 8/1988 | Tepera | E04C 2/423 52/669 |
| 7,959,104 B2 | 6/2011 | Kuntz | |
| 8,517,309 B2 * | 8/2013 | Robinson | B64C 1/1407 52/630 |
| 9,657,489 B2 * | 5/2017 | Harper | E04C 2/08 |
| 9,840,041 B2 * | 12/2017 | Hallander | B29C 66/00145 |
| 9,896,180 B2 * | 2/2018 | Raeckers | B64F 5/10 |
| 10,183,746 B2 * | 1/2019 | McCullough | B64U 10/16 |

(Continued)

FOREIGN PATENT DOCUMENTS

| CN | 105059526 A | 11/2015 |
|---|---|---|
| CN | 105775151 A | 7/2016 |

(Continued)

OTHER PUBLICATIONS

Nathan ("H-Frame Quadcopter") (Year: 2012).*

(Continued)

*Primary Examiner* — Assres H Woldemaryam

(57) ABSTRACT

A frame assembly for unmanned aerial vehicle comprising: at least two parallel first frame members, a second frame member orthogonal to the first frame member, and a fixing member fixed to each of the first and second frame members.

6 Claims, 5 Drawing Sheets

(56) References Cited

U.S. PATENT DOCUMENTS

| | | | |
|---|---|---|---|
| 10,183,747 B1* | 1/2019 | Longhi | B64C 25/54 |
| 10,647,404 B2* | 5/2020 | Sugaki | B64U 10/16 |
| 11,142,311 B2* | 10/2021 | McCullough | B64C 11/46 |
| 2009/0008499 A1* | 1/2009 | Shaw | B64C 27/52 244/17.23 |
| 2009/0320398 A1* | 12/2009 | Gouvea | B29C 66/474 52/309.1 |
| 2015/0183505 A1* | 7/2015 | Fink | B64C 1/06 244/119 |
| 2015/0379876 A1* | 12/2015 | Navot | G08G 5/0069 701/301 |
| 2017/0043870 A1* | 2/2017 | Wu | B64D 47/08 |
| 2017/0291677 A1* | 10/2017 | Harris | B64U 30/293 |
| 2018/0030887 A1 | 2/2018 | Zhao et al. | |
| 2018/0043982 A1* | 2/2018 | Fink | B64C 1/12 |
| 2019/0283856 A1* | 9/2019 | Clapp | B32B 7/12 |
| 2021/0001974 A1* | 1/2021 | Kunii | B64U 30/20 |

FOREIGN PATENT DOCUMENTS

| | | |
|---|---|---|
| CN | 106995052 A | 8/2017 |
| JP | 2017519297 A | 7/2017 |
| JP | 2017532256 A | 11/2017 |
| JP | 2019191585 A | 10/2019 |
| JP | 2020011575 A | 1/2020 |
| KR | 20160148862 A | 12/2016 |
| KR | 101883346 B1 | 7/2018 |
| WO | 2019048996 A1 | 3/2019 |
| WO | 2019155854 A1 | 8/2019 |
| WO | 2020017488 A1 | 1/2020 |

OTHER PUBLICATIONS

Simon Hahnel, "Wooden 380H Quadcopter Build Part 1 part 2" (Year: 2015).*
Graham Dyer, "DIY Carbon H-Frame Quadcopter" (Year: 2012).*
Humdiwiki, "DIY H-Frame Quadcopter" (Year: 2015).*
Verbeke et al. (doc. "The Design and Construction of a High Endurance Hexacopter suited for Narrow Corridors"). (Year: 2014).*
Notice of reasons for refusal dated Mar. 25, 2021 for Japanese Patent Application No. 2021-034734.
Rejection Decision dated Jan. 18, 2023 for Chinese Patent Application No. 202120426834.4.
Supplementary European Search Report and Written Opinion dated Sep. 19, 2023 for European Application No. 20921249.7.
Notice of reasons for refusal dated Oct. 19, 2023 for Japanese Patent Application No. 2021-102119.
Notice of Reasons for Refusal dated Feb. 29, 2024 for Japanese Patent Application No. 2021-102119.
Notice of Reasons for Refusal dated Aug. 1, 2024 for Japanese Patent Application No. 2021-102119.

* cited by examiner

FRAME ASSEMBLY AND METHOD FOR MANUFACTURING SAME

TECHNICAL FIELD

The present invention relates to a frame assembly and a method for manufacturing the frame assembly.

BACKGROUND ART

The stabilization of an aircraft is promoted, for example, when a photographic equipment is mounted (see Patent Literature 1).

PRIOR ART LIST

Patent Literature

[Patent Literature 1] Japanese Unexamined Patent Publication No. 2019-191585

SUMMARY OF THE INVENTION

Technical Problem

However, Patent Literature 1 cannot eliminate instability due to bending of the frame or the like.

The present invention has been made in view of such circumstances, and an object of the present invention is to provide a technique capable of stabilizing the frame of an aircraft.

Technical Solution

The main invention of the present invention for achieving the above object is a frame assembly for unmanned aerial vehicle comprising at least two parallel first frame members, a second frame member orthogonal to the first frame member, and a fixing member fixed to each of the first and second frame members.

Other problems disclosed in the present application and technical solutions thereof will be clarified in the embodiments of the invention and the accompanying figures.

Advantageous Effects

According to the present invention, it is possible to stabilize the frame of an aircraft.

DETAILED DESCRIPTION OF THE EMBODIMENTS

Figure 1:
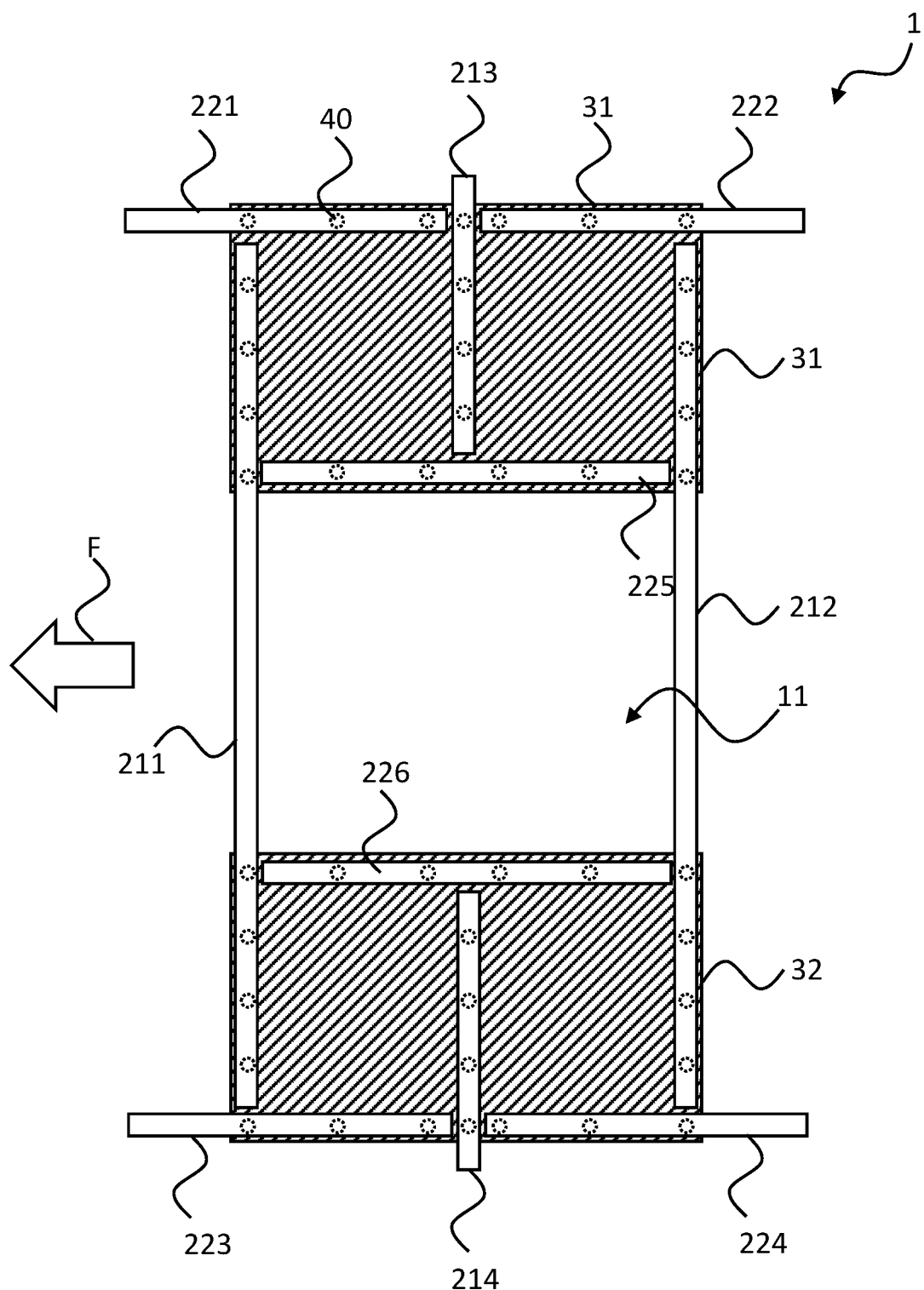
FIG. 1 is a top view of the frame assembly 1 of the present embodiment.

The contents of the embodiment of the present invention will be listed and described. The present invention has, for example, the following configuration.

[Item 1]
A frame assembly for an unmanned aerial vehicle comprising:
at least two parallel first frame members;
a second frame member orthogonal to the first frame member; and
a fixing member fixed to each of the first and second frame members.

[Item 2]
The frame assembly according to Item 1,
wherein at least either one of the first and second frame members or the fixing member forms an opening in the central part of the frame assembly.

[Item 3]
The frame assembly according to Item 1,
wherein the two plate-shaped fixing members sandwich the first and second frame members.

[Item 4]
The frame assembly according to Item 3,
wherein an opening is provided only in one of the fixing members.

[Item 5]
A frame assembly for an unmanned aerial vehicle comprising:
first and second frame members extending on a plane; and
a fixing member that extends in parallel with the plane and is fixed to each of the first and second frames.

[Item 6]
A frame assembly for an unmanned aerial vehicle,
wherein a plurality of frame members sandwiched by two plate-shaped materials are riveted to the plate-shaped materials.

[Item 7]
The frame assembly according to Item 6,
wherein an opening is provided only in one of the plate-shaped materials.

[Item 8]
A frame assembly for an unmanned aerial vehicle,
wherein a fixing member is riveted to a plurality of frame members.

[Item 9]
A frame assembly for an unmanned aerial vehicle, comprising:
first and second frame members arranged on a plane: and
a fixing member fixed to each of the first and second frames,
wherein the fixing member is fixed to at least either one of the first and second frame members in at least two parts.

[Item 10]
The frame assembly according to Item 9,
wherein the fixing member is fixed to the first and second frame members by rivets.

[Item 11]
The frame assembly according to Item 9,
wherein the two plate-shaped fixing members sandwich the first and second frame members.

[Item 12]
The frame assembly according to Item 11,
wherein an opening is provided only in one of the fixing members.

[Item 13]
A frame assembly, wherein a plate-like material is fixed to a plurality of frame members comprising carbon fiber reinforced plastic.

[Item 14]
The frame assembly according to Item 13,
wherein the plate-shaped material is riveted to each of the frame members.

[Item 15]
The frame assembly according to Item 13,
wherein the two plate-shaped materials sandwich the frame member.

[Item 16]
The frame assembly according to Item 15,
wherein an opening is provided only in one of the plate-shaped materials.

[Item 17]
A method for manufacturing a frame assembly for an unmanned aerial vehicle,
wherein a fixing member is fixed to each of at least two parallel first frame members and a second frame member orthogonal to the first frame member.

[Item 18]
The method for manufacturing a frame assembly according to Item 17,
wherein at least either one of the first and second frame members and the fixing member is arranged so as to form an opening in the central part of the frame assembly.

[Item 19]
The method for manufacturing a frame assembly according to Item 17,
wherein the first and second frame members are sandwiched by the two fixing members in plate-shape.

[Item 20]
The method for manufacturing a frame assembly according to Item 19,
wherein an opening is provided only in one of the fixing members.

[Item 21]
A method for manufacturing a frame assembly for an unmanned aerial vehicle,
wherein a fixing member extending in parallel with a plane is fixed to each of the first and second frame members extending on the plane.

[Item 22]
A method for manufacturing a frame assembly for an unmanned aerial vehicle,
wherein a plurality of frame members sandwiched by two plate-shaped members are riveted to the plate-shaped materials.

[Item 23]
The method for manufacturing a frame assembly according to Item 22,
wherein an opening is provided only in one of the plate-shaped materials.

[Item 24]
A method for manufacturing a frame assembly for an unmanned aerial vehicle, characterized by riveting a fixing member to a plurality of frame members.

[Item 25]
A method for manufacturing a frame assembly for an unmanned aerial vehicle,
wherein, in fixing a fixing member to each of the first and second frame members arranged on a plane, the fixing member is fixed to at least either one of the first and second frame members in at least two parts.

[Item 26]
The method for manufacturing a frame assembly according to Item 25,
wherein the fixing member is fixed to the first and second frame members by rivets.

[Item 27]
The method for manufacturing a frame assembly according to Item 25,
wherein the first and second frame members are sandwiched by the two plate-shaped fixing members.

[Item 28]
The method for manufacturing a frame assembly according to Item 27,
wherein an opening is provided only in one of the fixing members.

[Item 29]
A method for manufacturing a frame assembly, characterized by fixing a plate-like material to a plurality of frame members made of a carbon fiber reinforced plastic.

[Item 30]
The method for manufacturing a frame assembly according to Item 29, characterized by riveting the plate-shaped material to each of the frame members.

[Item 31]
The method for manufacturing a frame assembly according to Item 29,
wherein the frame members are sandwiched by the two plate-shaped materials.

[Item 32]
The method for manufacturing a frame assembly according to Item 31,
wherein an opening is provided only in one of the plate-shaped materials.

<Overview of Frame Assembly>

Hereinafter, a frame assembly 1 for an unmanned aerial vehicle according to one embodiment of the present invention will be described. The frame assembly 1 of the present embodiment includes a structure for fixing a fixing member to a plurality of frame members.

The material of the frame member is, for example, CFRP (Carbon Fiber Reinforced Plastic). Similarly, the material of the fixing member may also be made of CFRP. The rigidity of the frame assembly 1 can be ensured by making the fixing member into a plate shape and fixing it to a plurality of frame members. Further, the rigidity of the frame assembly 1 can be ensured by arranging a rod-shaped fixing member as a diagonal brace between a plurality of frame members.

Further, the fixing member can be riveted to the frame member. Thereby, a mechanism such as a clamp can be omitted, and the weight of the frame assembly 1 can be reduced. The rivets can be arranged in two parts with respect to one frame member.

Further, the fixing member can be made into a plate shape, and the frame member can be sandwiched by the two fixing members. Thereby, the rigidity of the frame assembly 1 in the up-down direction (sandwiching direction) can be ensured. An opening can be provided in one of the plate-shaped fixing members. Therefore, the weight of the frame assembly 1 can be reduced, and various parts and the like can be easily arranged in the opening.

<Structure of Frame Assembly 1>

FIG. 1 is a top view of the frame assembly 1 of the present embodiment. The frame assembly 1 of the example of FIG. 1 can be used for an unmanned vehicle flying with the direction of arrow F as the forward direction. The frame assembly 1 includes two parallel frame members (e.g., first frame members) 211 and 212 extending in the left-right direction perpendicular to the front-back direction. At one end of the frame members 211 and 212, frame members (e.g., second frame members) 221 and 222 are arranged parallel to the front-rear direction. At the other end of the frame members 211 and 212, frame members (e.g., third frame members) 223 and 224 are arranged parallel to the front-rear direction. Further, between the frame members 211 and 212, frame members (e.g., fourth frame members) 225 and 226 extending in parallel in the front-rear direction while spaced apart from the ends of the frame members 211 and 212 are provided. Further, the frame members (e.g., fifth frame members) 213 and 214 may be provided in the left-right direction from the frame members 225 and 226 toward the outside of the frame assembly 1, respectively.

Plate-shaped fixing members 31 and 32 are arranged at the left and right ends of the frame assembly 1. The fixing member 31 is fixed to each of the frame members 211, 212, 213, 221, 222, 225 by the rivets 40. The fixing member 31 is riveted to each of the frame members 211, 212, 213, 221, 222, and 225 at a plurality of parts. Similarly, the fixing member 32 is fixed to each of the frame members 211, 212, 214, 223, 224, 226 by the rivets 40 at a plurality of parts. An opening 11 is formed in the central part of the frame assembly 1. When the frame assembly 1 is used for the aircraft, various payloads can be arranged in the opening 11.

Figure 2:
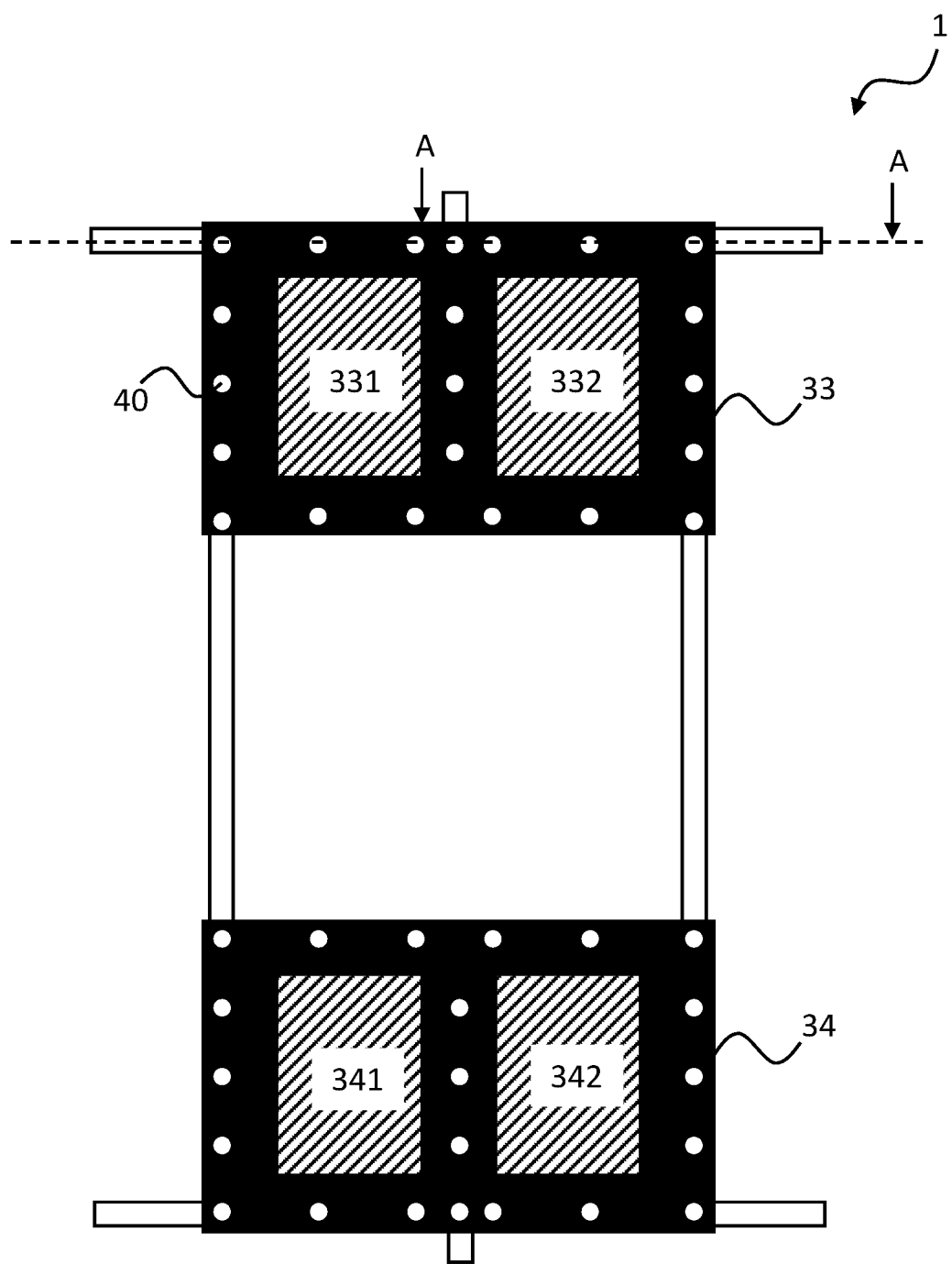
FIG. 2 is a top view of the frame assembly 1 of the present embodiment.

FIG. 2 is a top view of the frame assembly 1 of the present embodiment. In an example in FIG. 2, the fixing members 33 and 34 are further arranged so as to oppose to the fixing members 31 and 32 of the frame assembly 1 shown in FIG. 1. The frame members 211, 212, 213, 221, 222, 225 are sandwiched by the fixing members 31 and 33. Similarly, the frame members 211, 212, 223, 224, 226 are sandwiched by the fixing members 32 and 34. The fixing member 33 is fixed to each of the frame members 211, 212, 213, 221, 222, 225 by the rivets 40 at a plurality of parts. Similarly, the fixing member 34 is also fixed to each of the frame members 211, 212, 223, 224, and 226 by the rivets 40 at a plurality of parts.

Figure 3:
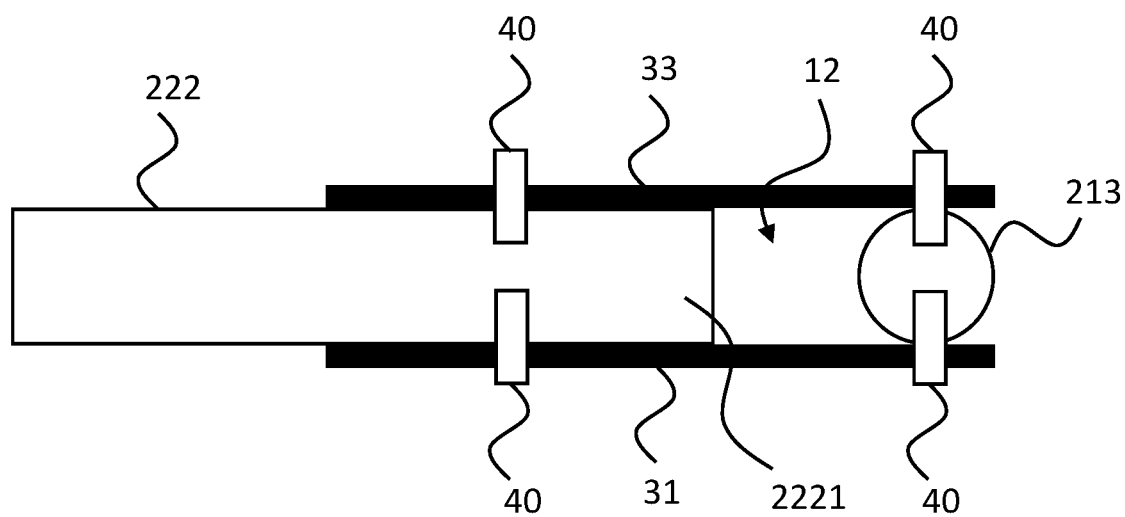
FIG. 3 is a sectional view taken along the line A-A of FIG. 2.
Figure 4:
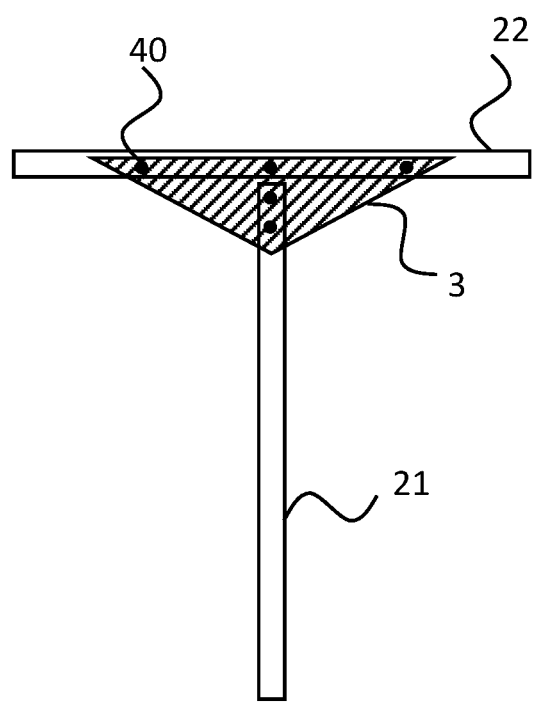
FIG. 4 is a diagram illustrating another configuration example in the frame assembly 1.

FIG. 3 is a sectional view taken along the line A-A of FIG. 2. The fixing members 31 and 33 are shown fixed to the frame member 222 by the rivets 40 and also shown fixed to the frame member 213 by the rivet 40. The end of each frame member may be separated from the other frame members, and also in an example in FIG. 3, a gap 12 is provided between the end part 2221 of the frame member 222 and the frame member 213.

Returning to FIG. 2, openings 331 and 332 are provided in the fixing member 33. Therefore, in the top view of FIG. 2, the fixing member 31 can be visually recognized from the openings 331 and 332.

Similarly, the fixing member 34 is also provided with openings 341 and 342, and the fixing member 32 can be visually recognized through the openings 341 and 342 from above of the frame assembly 1. When the frame assembly 1 is used for the aircraft, a control mechanism or the like can be, for example, arranged in the openings 331, 332, 341 and 342.

Figure 5:
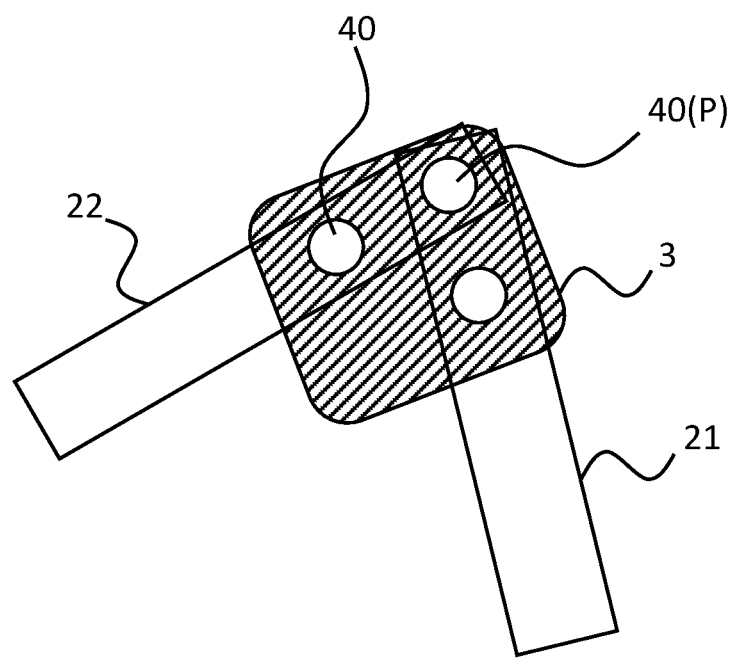
FIG. 5 is a diagram illustrating another configuration example in the frame assembly 1.

FIG. 5 illustrates another configuration example in the frame assembly 1. As shown in FIG. 5, the longitudinal directions of the plurality of frame members 21 and 22 may not be vertical. Even in an example in FIG. 5, the fixing member 3 is riveted to each of the frame members 21 and 22 by the rivets 40 at a plurality of parts. As shown in FIG. 5, the two frame members 21 and 22 can be fixed by the rivet 40 (P) without providing a gap between the two frame members 21 and 22. Even in the frame assembly 1 shown in FIGS. 1 and 2, the end parts of a part or the whole of the frame members may be fixed to other frame members.

Although the present embodiment has been described above, the above-described embodiment is merely an example for facilitating the understanding of the present invention and should not be construed as limiting the present invention. The present invention can make some modifications and improvements without departing from the spirit thereof, and the present invention includes an equivalent thereof.

DESCRIPTION OF REFERENCE NUMERALS

1: frame assembly
3: fixing member
21, 22: frame members
31-34: fixing member
40: rivets
211-213: frame members
221-226: frame members

The invention claimed is:

1. A frame assembly for an unmanned aerial vehicle comprising:
   two parallel first frame members spaced apart from each other in a first direction;
   two second frame members each provided at a first end of each of the first frame members, each of the second frame members extending in the first direction orthogonal to a second direction in which each of the first frame members extends;
   two third frame members each provided at a second end of each of the first frame members, each of the third frame members extending in the first direction;
   two fourth frame members each provided between the first frame members, each of the fourth frame members extending in the first direction and being disposed closer to a central part of the frame assembly than the second frame members and the third frame members;
   a first plate-shaped fixing member fixed to each of the first and second frame members, and one of the fourth frame members, wherein the first plate-shaped fixing member is provided on an area defined by the first frame members, the second frame members, and the one of the fourth frame members; and
   a second plate-shape fixing member, wherein the first frame members, the second frame members, and the one of the fourth frame members are sandwiched by the first and second plate-shaped fixing members;
   wherein the first frame members and the fourth frame members enclose a first opening in the central part of the frame assembly, and
   wherein a second opening is provided only in one of the first and second plate-shaped fixing members through which the other of the first and second plate-shaped fixing members is visible.

2. The frame assembly according to claim 1, wherein the frame assembly is included in an unmanned aerial vehicle.

3. The frame assembly according to claim 1, wherein the second opening is provided in a central part of the one of the first and second plate-shaped fixing members.

4. The frame assembly according to claim 3, wherein a control mechanism is arranged in the second opening.

5. The frame assembly according to claim 1, further comprising two fifth frame members extending in the second direction from the fourth frame members, respectively, one of the fifth frame members being provided between and extending beyond the second frame members, the other of the fifth frame members being provided between and extending beyond the third frame members.

6. The frame assembly according to claim 5, wherein the first frame members, the second frame members, the one of the fourth frame members, and the one of the fifth frame members are sandwiched by the first and second plate-shaped fixing members.

\* \* \* \* \*